United States Patent [19]

Stemme

[11] Patent Number: 5,673,873
[45] Date of Patent: Oct. 7, 1997

[54] RESCUE SYSTEM FOR AIRCRAFT

[75] Inventor: Reiner Stemme, Berlin, Germany

[73] Assignee: Stemme GmbH & Co. KG, Berlin, Germany

[21] Appl. No.: 465,632

[22] Filed: Jun. 5, 1995

[30] Foreign Application Priority Data

Jun. 9, 1994 [DE] Germany ............ 44 21 139.2

[51] Int. Cl.$^6$ .................................. B64D 25/00
[52] U.S. Cl. ........................... 244/75 R; 244/139
[58] Field of Search ................ 244/138 R, 139, 244/141

[56] References Cited

U.S. PATENT DOCUMENTS

| | | | |
|---|---|---|---|
| 1,970,812 | 8/1934 | Myers | 244/139 |
| 2,478,758 | 8/1949 | Frieder et al. | 244/139 |
| 2,673,051 | 3/1954 | Frost | 244/139 |
| 3,107,887 | 10/1963 | Dixon et al. | 244/139 |
| 3,315,920 | 4/1967 | Caughron | 244/139 |
| 3,409,254 | 11/1968 | Nastase | 244/138 R |
| 4,033,528 | 7/1977 | Diggs | 244/139 |
| 4,040,583 | 8/1977 | Bihrle, Jr. . | |
| 4,298,177 | 11/1981 | Berlongieri | 244/139 |
| 4,480,807 | 11/1984 | Bowen | 244/139 |
| 4,496,122 | 1/1985 | Whipple . | |
| 5,020,739 | 6/1991 | Vairo et al. . | |

FOREIGN PATENT DOCUMENTS

| | | |
|---|---|---|
| 3437824 | 4/1986 | Germany . |
| 4102788 | 7/1991 | Germany . |
| 4208839 | 9/1993 | Germany . |
| 4239638 | 5/1994 | Germany . |
| 4239634 | 6/1994 | Germany . |
| 1-306397 | 2/1990 | Japan . |

OTHER PUBLICATIONS

J.M. Lenorovitz: "Hermes Definition Program Begins; First Manned Mission Set for 1998". In: Aviation Week & Space Technology, Apr. 11, 1988, p. 51.

*Primary Examiner*—Galen L. Barefoot
*Attorney, Agent, or Firm*—Spencer & Frank

[57] ABSTRACT

Aircraft, in particular for travel and sporting purposes or as a plane for business travel, having a rescue system which, by means of a parachute, makes it possible to return at least the cabin including the persons contained therein, to the ground, wherein, in particular, a parachute arrangement is provided having at least one parachute, with this arrangement being stowed in a first region of the fuselage which is located forward of the center of gravity of the aircraft in the flight direction, wherein additional means are provided which exert a force effect in the manner that between the longitudinal axis of the aircraft (1) and its direction of movement an angle of substantially 90° is formed (slip position) before the parachute (7.1, 7.2) is deployed.

13 Claims, 5 Drawing Sheets

RESCUE SYSTEM FOR AIRCRAFT

BACKGROUND OF THE INVENTION

The invention relates to an aircraft of the type including a rescue system in which a parachute is stowed in a region of the fuselage located forward of the center of gravity of the aircraft in a direction of flight and the parachute is deployable for allowing a return of at least the cabin portion of the fuselage including the persons contained therein to the ground.

From U.S. Pat. No. 4,033,528, it is known, for example, to return a damaged aircraft to the ground on a parachute.

From EP-A-0 599 437, it is further known that during this process the aircraft can assume a substantially vertical position such that the fuselage of the aircraft moves toward the ground, tail unit first. This is made possible through a rescue system which is provided with two parachutes, which system is disposed in the region of the tip of the fuselage of the aircraft. By deploying the individual parachutes, the aircraft, which is substantially moving horizontally, is decelerated, with the fuselage of the aircraft tilting more and more into the vertical as the flying speed decreases while pointing down in sternward direction.

All such rescue systems have the drawback that difficulties arise during rescue near to the ground—for example, during a takeoff or landing operation—because then the speed of the aircraft relative to the distance from the ground is relatively high. After the damage has occurred, the speed can then no longer be reduced sufficiently before ground contact is made.

Furthermore, there is also the risk that the parachutes of the rescue system may get caught on the rudder unit of the aircraft if unfavorable flow conditions prevail. This prevents the implementation of the rescue. In aircraft with tail-mounted propulsion, this risk is even greater because, in accordance with its function, the propulsion unit generates a defined, sternwardly oriented air flow through which the parachutes of the rescue system can be pulled toward the engine. This risk becomes greater as the angle between the longitudinal axis of the aircraft and the directional vector of its movement decreases.

SUMMARY OF THE INVENTION

Starting from the deficiencies of the prior art, it is an object of the invention to further constructively modify an aircraft of the type mentioned in the introduction such that the aircraft's rescue system can be rendered operative without disturbing influences by assembly components which constitute part of the aircraft.

The above and other objects are accomplished in accordance with the invention by the provision of an aircraft, comprising: a fuselage having a longitudinal axis and including a cabin for accommodating people; wings extending from the fuselage; a rescue system including a parachute arrangement having at least one parachute and being stowed in a first region of the fuselage located forward of the center of gravity of the aircraft in a direction of flight, the at least one parachute being deployable for allowing a return of at least the cabin including the persons contained therein to the ground; and a safety system including force means mounted on the aircraft for exerting a force on the aircraft to form an angle of substantially 90° between the longitudinal axis of the aircraft and its direction of movement before the at least one parachute is deployed.

The invention includes the finding that the risk of the parachutes of the rescue system of an aircraft getting caught on the aircraft's tail unit or, possibly, on its tail-mounted propulsion unit is considerably reduced if the aircraft assumes a position during the deployment of the parachute/s in which the angle between the longitudinal axis of the aircraft and the directional vector of its movement substantially amounts to 90°. Furthermore, in this stable position, the speed is considerably reduced over a short period of time because the lateral fuselage contour is oriented transversely to the relative wind and, thus, a substantial (air) braking effect occurs. In this manner, an effective reduction of the flying speed can take place quickly, also in lower-level air strata, so that the rescue system can still be used effectively. In addition, the damaged aircraft is prevented from going through uncontrollable reeling motions which, on the one hand, are stressful for the passengers and, on the other, render the subsequent rescue operation more difficult.

According to a preferred embodiment, a safety system is provided which includes means for generating a local deceleration effect located in a region of each wing of the aircraft, which region is at a distance from the fuselage, and preferably comprise a parachute allocated to each wing. The purposeful deployment of one of the parachutes out of the respective wing generates an additional torque (or angular momentum) whose size suffices to enlarge the angle between the longitudinal axis of the aircraft and the directional vector of the aircraft's movement (or of the directional vector of the flying speed). This is possible in an advantageous manner, independently of the attitude of the aircraft with respect to the horizontal, because the parachutes are arranged on the side of the corresponding wing facing away from the fuselage of the aircraft. In this process, the triggering of a deceleration device preferably takes place at the wing tip which lies opposite of the damaged side of the aircraft.

The afore-described enlargement of the angle between the longitudinal axis (or its projection onto the horizontal) of the aircraft and the directional vector of the movement (or the speed) of the aircraft ensures in an advantageous manner that the actual rescue system of the aircraft, which comprises several parachutes, can be deployed without impairment if a damage occurs. The best prerequisites for a risk-free deployment of the rescue parachutes prevail at an angle of approximately 90°. If the angle is too small, the parachutes disposed in the front section of the fuselage may collide during deployment—owing to the prevailing flow conditions—with the rudder unit of the aircraft and, in the worst case, in aircraft with tail propulsion systems, with the corresponding propulsion system. This impairs the opening of the rescue parachutes and therewith the success of a necessary rescue maneuver.

According to an advantageous modification of the invention, a control is provided which coordinates the temporal sequence of the deployment of the parachutes of the safety system and of the rescue system. For a rescue maneuver to be successful, it is required that the rescue parachutes be deployed only a specific period of time after a parachute of the safety system has become operative. This period of time is required so that the longitudinal axis (or its projection onto the horizontal) of the aircraft can be swung substantially transversely to the direction of movement of the aircraft. The length of time required for this process depends on the respective flying speed of the aircraft so that the control not only comprises means for the evaluation of attitude-specific and acceleration-specific characteristic values, but also sensors for acquiring the momentary flying speed and delay elements controlled by this quantity. For the digital evaluation and further processing of the physical quantities, which have been acquired by sensor and which represent the respective flight situation, computing units are provided whose output signals are used for triggering the safety system or the rescue system.

According to another advantageous embodiment of the invention, a compressed air system is provided for the deployment of the parachutes of the safety system, thus rendering the safety system operative within an extremely short time.

Other advantageous modifications of the invention are described below in greater detail with reference to the accompanying drawings.

BRIEF DESCRIPTION OF THE PREFERRED EMBODIMENTS

Figure 1:
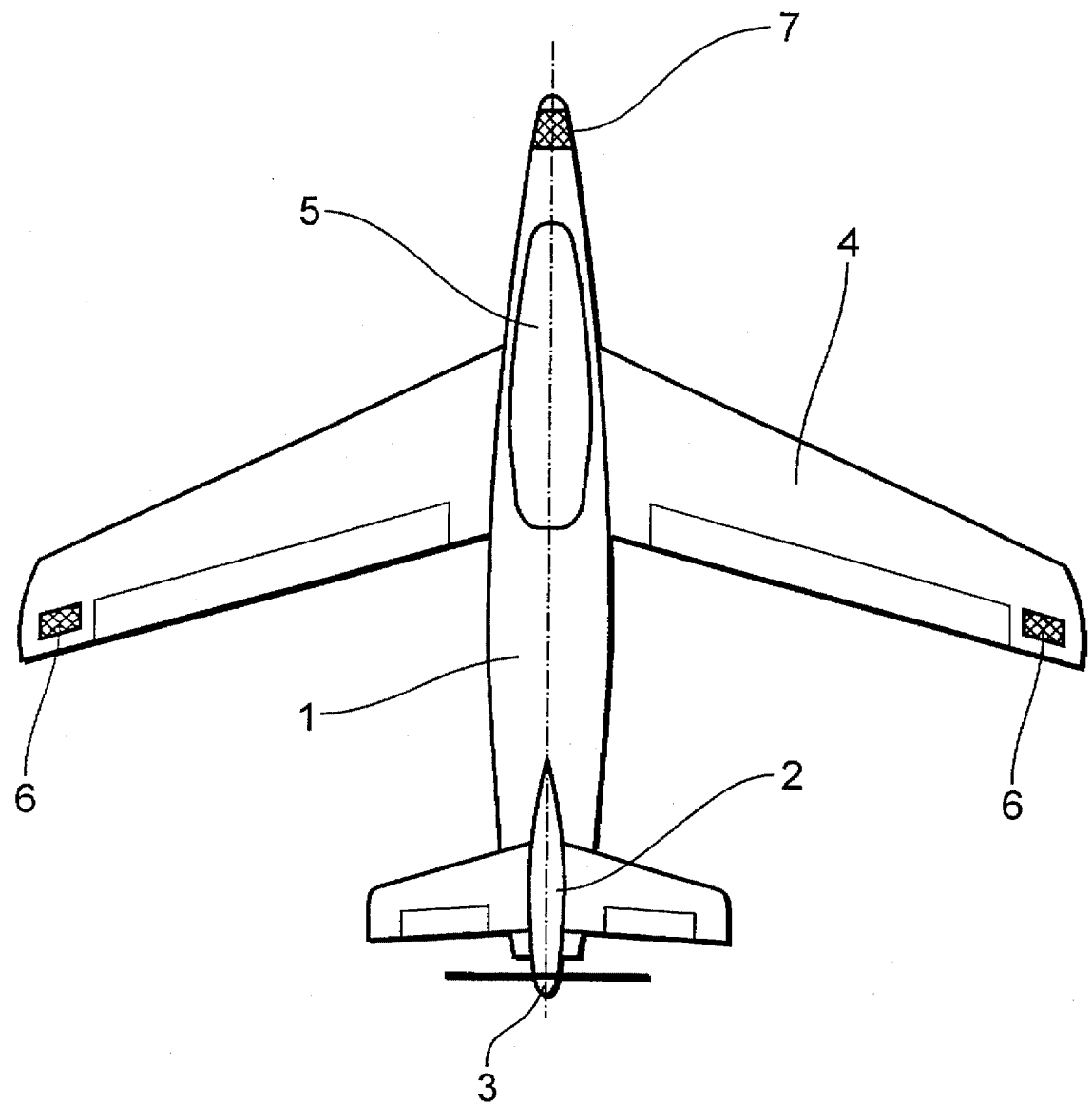
FIG. 1 shows a preferred embodiment of the invention in plan view.

The aircraft 1 shown from on top in FIG. 1 is provided with a propulsion unit 3 mounted at the tail end and is designed as a plane for business travel. A rescue system 7 of the aircraft 1 is disposed in the front section of the fuselage ahead of the cockpit and the passenger cabin 5. The rescue system 7 is provided with two parachutes (compare the illustration in FIGS. 4 and 5) and allows a successful rescue maneuver during which the aircraft is returned sternwardly to the ground. A safety system 6 is respectively arranged in the wings 4 of the aircraft 1. The positioning of the safety system 6 at the end of the wing 4, with the end being at a distance from the fuselage, has the advantage that, with simple and, most of all, relatively small-volume means, a large torque can be generated for swinging the fuselage of an aircraft which is moving at a specific flying speed. It is necessary that the safety system 6 be arranged on both sides, since the damage condition of the aircraft 1 triggering the rescue system 7, which is preferably provided with two parachutes, may possibly also be a condition in which the aircraft has lost one of its wings 4. The safety system 6 is provided with a parachute (compare position 6.1 according to FIG. 2b) which is transported out of the wing 4 in an advantageous manner by a compressed air device.

The deployment of the parachute generates a torque relative to the fuselage of the aircraft 1, with the torque unilaterally decelerating the aircraft 1 and therewith effecting a swinging of the fuselage transversely to the directional vector of the flying speed. In such a position of the fuselage the longitudinal axis (or its projection onto the horizontal) and the directional vector of the speed of the aircraft form an angle of approximately 90°and, the parachutes of the rescue system can be deployed without running the risk of the opening of these chutes being impeded by the rudder unit and/or a potentially tail-mounted propulsion unit of the aircraft.

In a simplified manner, FIGS. 2, 2a, 2b and 2c illustrate the phases from the occurrence of a damage condition to the fuselage of the damaged aircraft reaching a position in which the deployment of the parachutes of the installed rescue system is possible without any particular danger.

Figure 2:
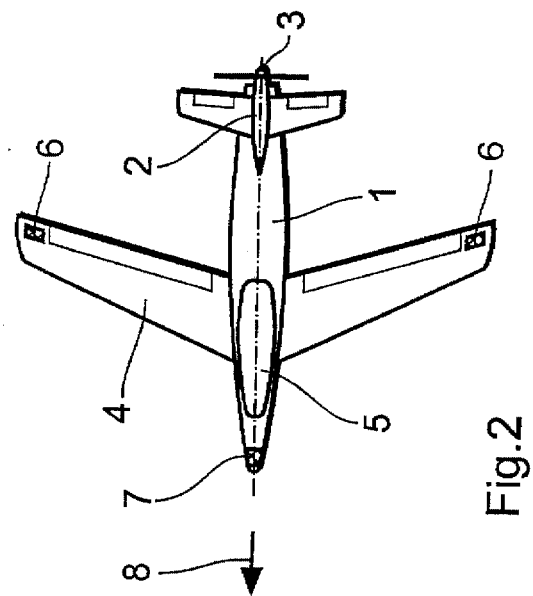
FIG. 2, 2a, 2b and 2c shown a graphic representation of the sequence of movements of a damaged aircraft after the triggering of the safety system according to the preferred embodiment of the invention.
Figure 2C:
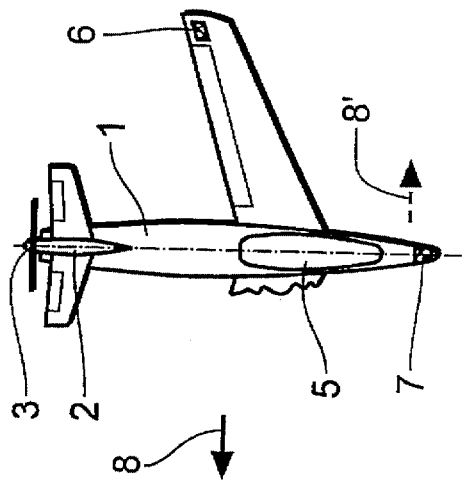
Figure 2A:
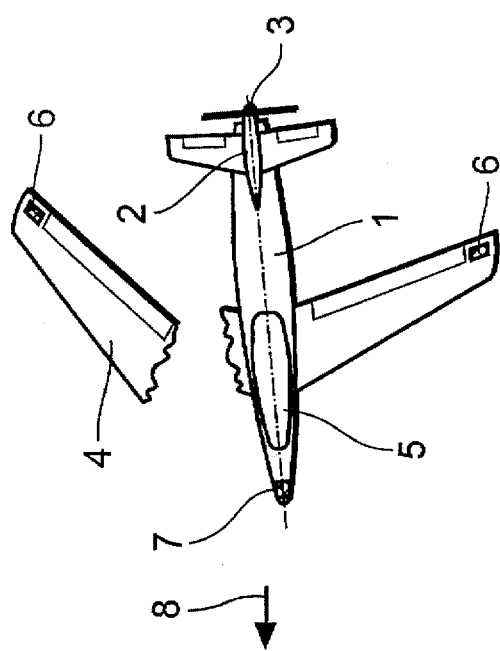
Figure 2B:
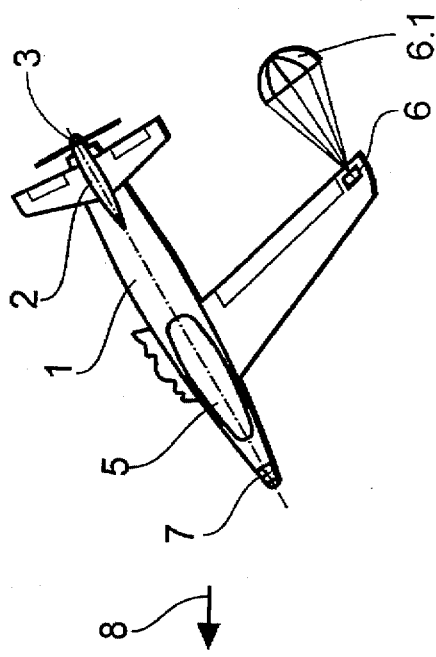

The aircraft 1 moves in a horizontal flying position on a predetermined flying path (FIG. 2). Owing to mechanical deficiencies (for example, in connection with increased stress), the fastening devices of the right wing 4 are ruptured. The aircraft 1 deviates from its present course. Between the center axis of the aircraft 1 and the directional vector 8 of its momentary speed there exists an angle having a small size (FIG. 2a). The deployment of the parachute 6.1 of the safety system 6 disposed in the remaining wing causes this angle to become further enlarged within a relatively short time (FIG. 2b).

When the fuselage is in the position in which the longitudinal axis and the directional vector 8 of the speed of the aircraft 1 form an angle of approximately 90° (slip position), the rescue system 7 can be activated. The direction of deployment 8' for the parachutes of the rescue system 7 is turned by 180° relative to the direction of movement 8 of the aircraft 1 so that there is no danger of the deployed parachutes of the rescue system 7 colliding with the rudder unit 2 and/or the propulsion unit 3 at the tail unit of the aircraft 1 (FIG. 2c).

Figure 3:
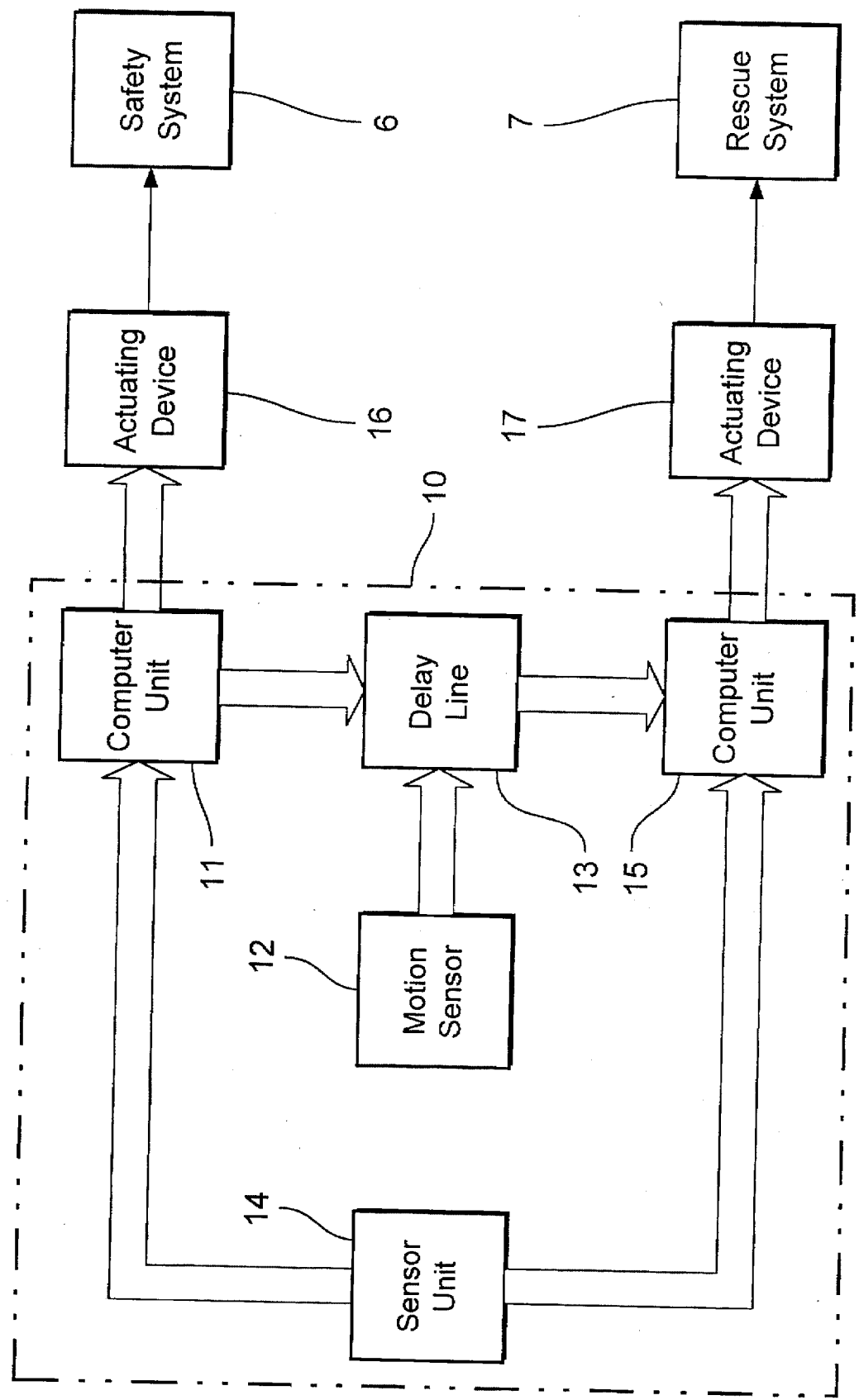
FIG. 3 is a control arrangement for triggering the rescue system as a function of the triggering of the safety system according to FIGS. 1 and 2 in block diagram.

Since there is only relatively little time available for the deployment of the parachutes of the rescue system in case of a damage condition, it is necessary for a successful rescue maneuver that an exact temporal coordination be ensured between the activation of the safety system and the response of the rescue system. For this purpose, a control is provided in the aircraft which respectively activates an actuating device for deploying the parachutes of the corresponding systems. FIG. 3 schematically illustrates an advantageous embodiment of such a control 10 in the form of a block diagram. The control 10 is provided with a sensor unit 14 having at least one attitude sensor and acceleration sensor whose measured values are fed as data quantities in digitized form to computer unit 11 and 15 respectively.

If the deviation of the measured values from the set values of the normal flight situation is correspondingly large, a damage condition is detected and the safety system 6 is triggered by an actuating device 16 which is activated by the computer unit 11. The corresponding parachute (compare position 6.1 in FIG. 2b) effects a swinging of the fuselage of the aircraft within a time duration that is a function of the momentary flying speed. Only after this has occurred is the triggering of the actual rescue system 7 useful. For this reason, the information regarding the fact that the safety system 6 has been triggered is transmitted from the computer unit 11 via a delay element 13 to the computer unit 15. This information and the deviation, which is determined via the sensor unit 14 and which indicates the damage condition in a comparison with the corresponding desired values, trigger the activation of the actuating device 17 of the rescue system 7 via the computer unit 15. The delay time of the delay element 13 is optimized as needed by the respective flying speed which is determined by the motion sensor 12.

Figure 4:
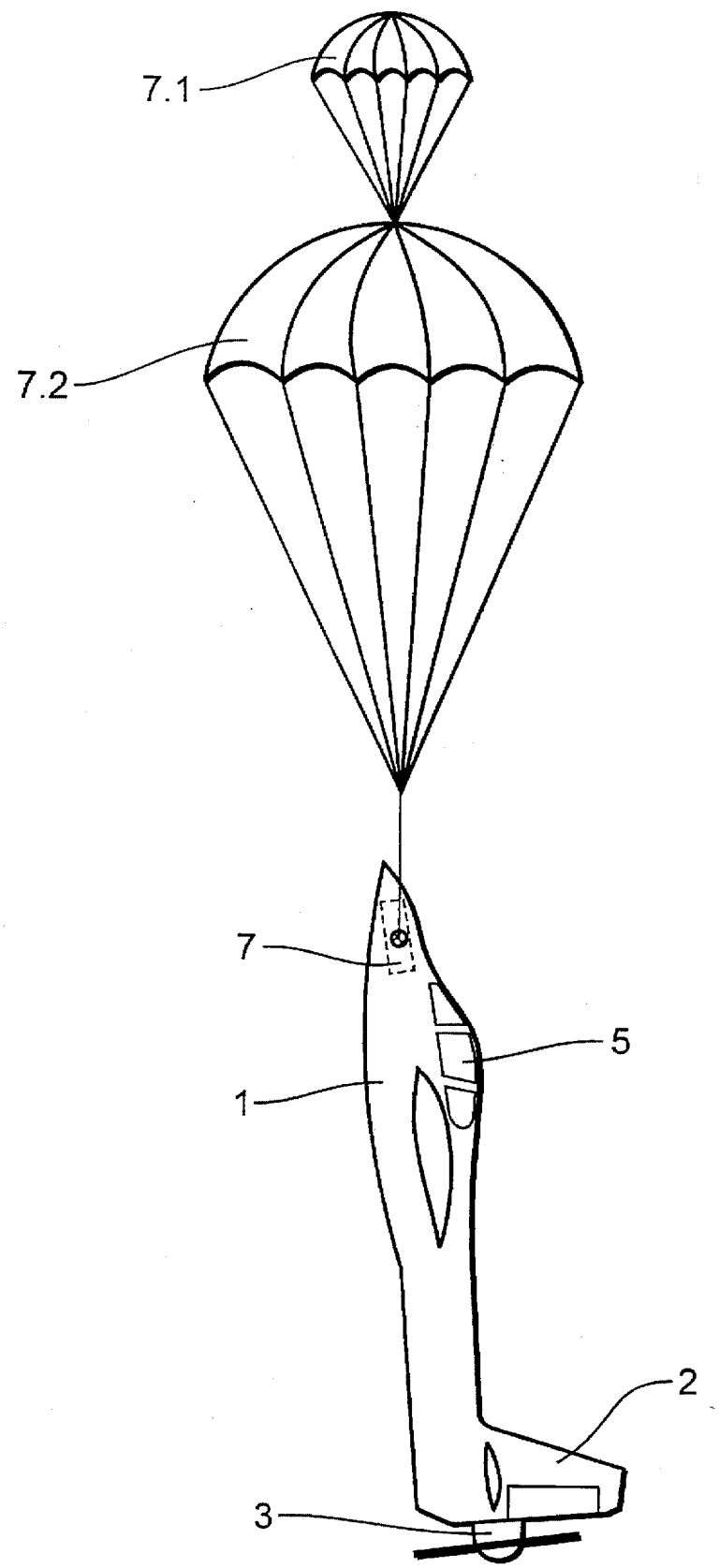
FIGS. 4 and 5 show the sequence of individual phases of a rescue operation following the successful activation of the rescue system.
Figure 5:
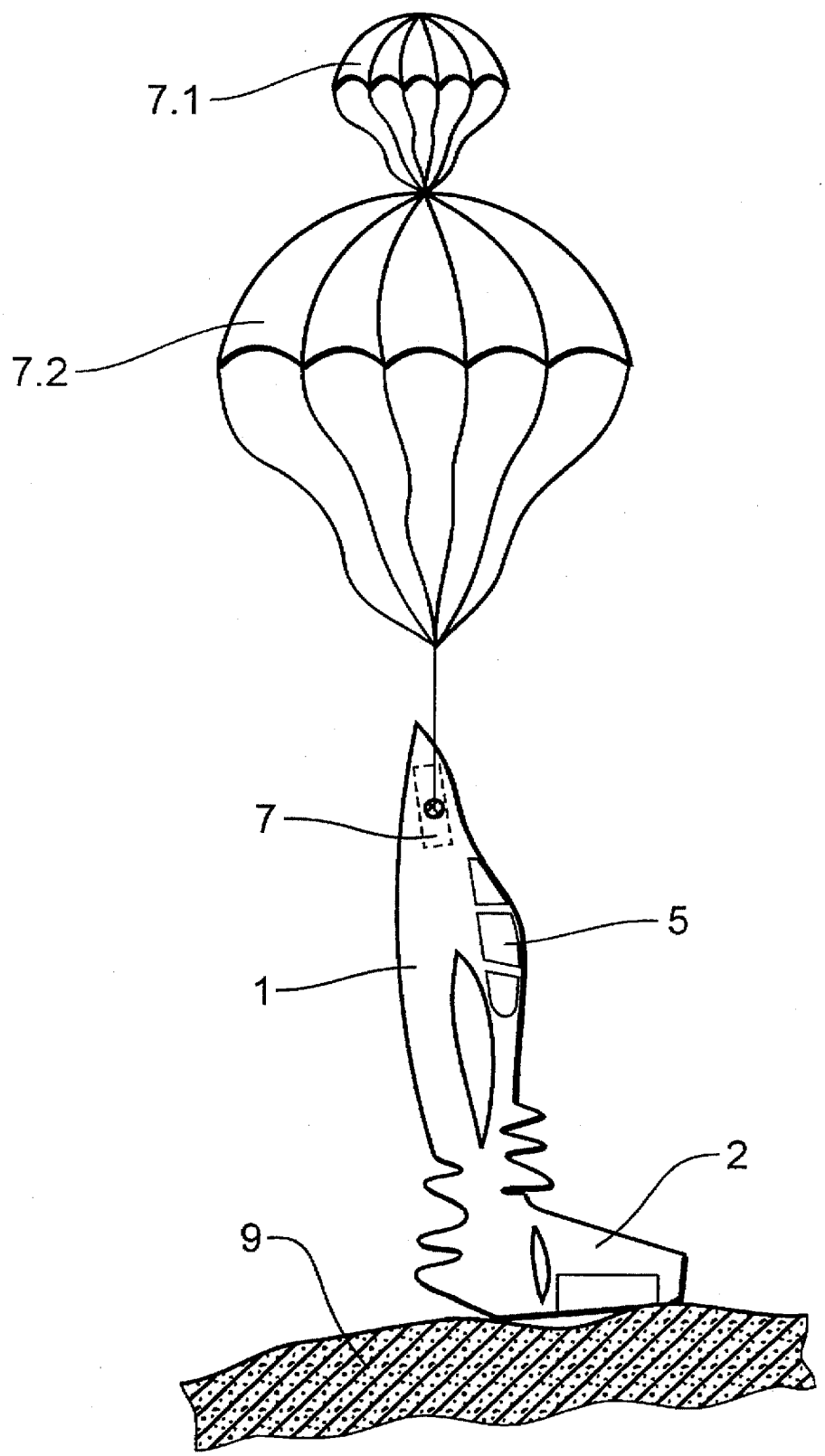

The FIGS. 4 and 5 schematically illustrate individual phases of the rescue maneuver. Once the safety system has placed the aircraft 1 into a transverse position shown in FIG. 2c, the rescue system 7 is activated. The parachutes 7.1 and 7.2 which are deployed during this process first reduce the speed of the aircraft 1 and simultaneously place the aircraft 1 into a position which is substantially vertical. The aircraft 1 is sternwardly returned to the ground 9, at a speed of vertical descent which is determined by the size of parachute 7.2. The center section of the fuselage containing the passenger cabin 5 has a greater stiffness than the tail section of the aircraft 1 which supports the rudder unit 2 and the tail propulsion unit 3. Therefore, the entire kinetic energy becomes effective in an advantageous manner as work of deformation in the tail section of the aircraft 1. This means that the probability is high that passengers and crew members will survive.

The invention is not limited in its implementation to the preferred embodiment indicated above. Rather, a number of variants are conceivable which make use of the above-described solution, even if the embodiments are fundamentally different in type.

I claim:

1. An aircraft, comprising:

a fuselage having a longitudinal axis and including a cabin for accommodating people;

wings extending from the fuselage;

a rescue system including a parachute arrangement having at least one parachute and being stowed in a first region of the fuselage located forward of the center of gravity of the aircraft in a direction of flight, the at least one parachute being deployable for allowing a return of at least the cabin including the persons contained therein to the ground; and a safety system including force means mounted on the aircraft for exerting a force on the aircraft for swinging the fuselage to form an angle of substantially 90° between the longitudinal axis of the aircraft and its direction of movement; and control means for activating the force means in advance of deployment of the at least one parachute.

2. The aircraft according to claim 1, wherein the force means is for generating a deceleration force on the aircraft.

3. The aircraft according to claim 2, wherein the force means comprises a further parachute.

4. The aircraft according to claim 2, wherein the force means comprises a propulsion system.

5. The aircraft according to claim 4, wherein the propulsion system comprises a rocket propulsion unit.

6. The aircraft according to claim 3, wherein the force means is disposed in a tip region of at least one of the wings.

7. The aircraft according to claim 6, wherein the force means comprises a further parachute and the at least one wing includes a stowage compartment in which the further parachute is stowed for being deployed counter to a normal flight direction of the aircraft.

8. The aircraft according to claim 7, wherein the force means includes a compressed air device for deployment of the further parachute.

9. The aircraft according to claim 1 wherein the control means for activating the force means includes a sensor means for detecting and evaluating a deviation of flight data of the aircraft from preset desired data and releasing an activation signal for activating the force means if a predetermined deviation is exceeded.

10. The aircraft according to claim 9, wherein the sensor means comprises at least one of an attitude sensor, flying speed sensor and acceleration sensor.

11. The aircraft according to claim 9, wherein the control means comprises a switching means far blocking deployment of the parachute of the residue system prior to activation of the force means.

12. The aircraft according to claim 9, wherein the control means comprises actuating means for a manual triggering of the force means.

13. The aircraft according to claim 9, wherein the control means comprises localizing means for detecting a location of damage to the aircraft and the control means responds to an output signal of the localizing means for releasing the activation signal to the force means on an undamaged side of the aircraft.

* * * * *